United States Patent [19]

Boutaghou et al.

[11] Patent Number: 5,500,780
[45] Date of Patent: Mar. 19, 1996

[54] DISK DRIVE SPINDLE MOTOR HAVING SPLIT WINDINGS FOR EACH PHASE

[75] Inventors: Zine-Eddine Boutaghou; Kevin J. Erickson, both of Rochester, Minn.

[73] Assignee: International Business Machines Corporation, Armonk, N.Y.

[21] Appl. No.: 286,760

[22] Filed: Aug. 5, 1994

[51] Int. Cl.$^6$ .................................................. G11B 17/02
[52] U.S. Cl. .................................... 360/99.08; 360/98.07; 360/99.04
[58] Field of Search ........................... 360/99.08, 97.01, 360/98.07, 99.04

[56] References Cited

U.S. PATENT DOCUMENTS

| | | | |
|---|---|---|---|
| 4,570,093 | 2/1986 | Morii et al. | 310/46 |
| 4,739,201 | 4/1988 | Brigham et al. | 310/49 |
| 4,882,643 | 11/1989 | Shirotori | 360/99.08 |
| 4,949,000 | 8/1990 | Petersen | 310/179 |
| 4,998,033 | 3/1991 | Hisabe et al. | 310/67 R |
| 5,040,085 | 8/1991 | Elsässer et al. | 360/98.07 |
| 5,193,084 | 3/1993 | Christiaens | 360/99.08 X |
| 5,195,002 | 3/1993 | Sakurai | 360/99.08 |
| 5,252,871 | 10/1993 | Inoue | 310/90 |
| 5,392,176 | 2/1995 | Anderson | 360/97.01 |

FOREIGN PATENT DOCUMENTS

| | | |
|---|---|---|
| 2743564 | 3/1979 | Germany . |
| 60-70941 | 4/1985 | Japan . |
| 2032731 | 2/1990 | Japan . |
| 3078163 | 4/1991 | Japan . |
| 3203859 | 9/1991 | Japan . |
| 8502069 | 5/1985 | U.S.S.R. . |

Primary Examiner—John H. Wolff
Attorney, Agent, or Firm—Roy W. Truelson

[57] ABSTRACT

A reduced size brushless DC motor preferably for use as a disk drive spindle motor includes a rotor having two sets of permanent magnets, and a stator having separate portions corresponding to the two sets. An upper set of permanent magnets and the corresponding portion of the stator are located within the upper portion of the hub, which fits within the holes of the disks of a disk drive. A lower set of permanent magnets and corresponding portion of stator are located in the flange of the motor hub which supports the disks from below. In one embodiment, the stator core has all L-shaped cross-sectional area in the plane of the motor axis, one leg of the L driving the upper set of magnets in the rotor and the other leg driving the flange magnets. In a second embodiment, the stator core includes two separate pieces, one corresponding to each set of permanent magnets. In either embodiment, the separate coils or coil portions may be electrically connected in series or in parallel, or may be connected to switches enabling them to be driven in series or parallel selectively. Furthermore, the phases of the two sets of permanent magnets may be staggered to reduce the effects of transition from one magnetic pole to the next. Where the stator core includes two separate pieces, it is also possible to stagger the stator phases as well, reducing torque pulsations and wire interference.

8 Claims, 8 Drawing Sheets

DISK DRIVE SPINDLE MOTOR HAVING SPLIT WINDINGS FOR EACH PHASE

FIELD OF THE INVENTION

The present invention relates to electric motors, and in particular to brushless DC electric motors of the type commonly used in disk drive storage devices.

BACKGROUND OF THE INVENTION

The extensive data storage needs of modern computer systems require large capacity mass data storage devices. A common storage device is the rotating magnetic disk drive.

A disk drive typically contains one or more smooth, flat disks which are rigidly attached to a common spindle. The disks are stacked on the spindle parallel to each other and spaced apart so that they do not touch. The disks and spindle are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle.

There is one transducer head for each disk surface containing data. The transducer head is an aerodynamically shaped block of material (usually ceramic) on which is mounted a magnetic read/write transducer. The block, or slider, flies above the surface of the disk at an extremely small distance as the disk rotates. The close proximity to the disk surface is critical in enabling the transducer to read from or write to the data patterns in the magnetizable layer. Several different transducer designs are used, and in some cases the read transducer is separate from the write transducer.

The actuator usually pivots about an axis to position the head. It typically includes a solid block near the axis having comb-like arms extending toward the disk, a set of thin suspensions attached to the arms, and an electro-magnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

As computer systems have become more powerful, faster, and more reliable, there has been a corresponding increase in demand for improved storage devices. These desired improvements take several forms. It is desirable to increase data capacity, to increase the speed at which the drives operate, to reduce the electrical power consumed by the drives, and to increase the resilience of the drives in the presence of mechanical shock and other disturbances.

In particular, there is a demand to reduce the physical size of disk drives. To some degree, reduction in size may serve to further some of the above goals. But at the same time, reduced size of disk drives is desirable in and of itself. Reduced size makes it practical to include magnetic disk drives in a range of portable applications, such as laptop computers, mobile pagers, and "smart cards".

An example of size reduction is the application of the PCMCIA Type II standard to disk drives. This standard was originally intended for semiconductor plug-in devices. With improvements to miniaturization technology, it will be possible to construct disk drives conforming to the PCMCIA Type It standard.

In order to shrink tile size of disk drives, every component must be reduced in size as much as possible. Size reduction of a component can not always be accomplished by merely scaling down. This is true in particular of tile spindle motor which rotates the disk.

Disk drive spindle motors are typically brushless direct current (DC) motors. These motors have a stationary set of electromagnets (the stator), and a set of permanent magnets attached to the rotating part of the motor (the rotor). The electromagnets of the stator are arranged in a circle surrounding the motor shaft. Each electromagnet includes a core (usually made of iron) surrounded by a coil (or winding) of electric wires. A motor controller, which is a set of switches and logic circuits on one or more circuit chips, sends pulses of electric current through the different coils to energize the electromagnets. The electromagnets are energized in a sequential pattern travelling around the shaft, inducing the permanent magnets in the rotor to follow, thus imparting a rotational force to the rotor.

Conventional disk drive spindle motors have generally employed one of two physical designs. In the first design, sometimes called a "pancake" motor, the stator electromagnets and rotor magnets are positioned under the disk stack. In order to reduce the overall height of the disk drive, the motor is made as flat and elongated as possible, giving it the name "pancake". However, even with a flattened motor, the design inevitably adds something to the overall height of the drive. In the second design the stator electromagnets and rotor magnets are contained within the holes of the disks on the disk stack. This design is referred to as an "in-hub" motor. An in-hub motor permits the overall height of the disk drive to be reduced, but it requires that the holes in the disks be sufficiently large to accommodate the motor components. The larger the holes, the less area that is available on the surface of the disks for recording data.

When attempting to shrink the size of conventional disk drive designs, the size of the spindle motor becomes a severely limiting factor. A conventional pancake motor is undesirable due to the need to reduce disk drive height, particularly in the case of the PCMCIA Type II form factor. An in-hub motor would appear to be the preferred design. However, the rotational force (torque) that the motor is capable of generating is related to the distance from the permanent magnet to the axis of rotation. As tile in-hub motor components are squeezed into the small space available in tile hole of a smaller disk, it becomes difficult to generate the torque needed for proper operation.

It is possible to design motors for PCMCIA drives using conventional techniques, but such designs involve trade-offs with other goals. Torque can be increased by increasing the amount of electric current pulsed through the windings, but this increases the power consumption of the drive and requires larger electronic components for pulsing the windings. Another solution is to enlarge the holes in the disks to increase the distance from the rotor magnets to the axis, thereby increasing the torque, but this reduces the area of the disk available for storing data. Alternatively, the motor can be operated at a slower speed, thereby reducing the amount of torque required, but this causes the disk drive to access data more slowly. It is desirable to develop a more compact disk motor design which reduces the need for these design trade-offs.

SUMMARY OF THE INVENTION

It is, therefore, an object of the present invention to provide an enhanced disk drive storage apparatus.

Another object of this invention is to provide an electric motor having a more compact size.

Another object of this invention is to provide an enhanced spindle motor for a disk drive storage device.

Another object of this invention is to provide a reduced size spindle motor for a disk drive storage device.

A brushless DC motor preferably for use as a spindle motor of a disk drive storage device includes a rotor having two sets of permanent magnets, and a stator having separate portions which drive the corresponding sets of permanent magnets. An upper set of permanent magnets and the corresponding portion of the stator are located within the main body or upper portion of the hub, which fits within the holes of the disk or disks of a disk drive. A lower set of permanent magnets and corresponding portion of stator are located in the flange of the motor hub which supports the disks from below. The lower set of magnets is thus positioned at a greater radial distance from the axis than the upper set, thereby increasing torque over what would be possible from magnets confined to the disk hole alone. We call this motor design the "double-decker" configuration.

In one embodiment, the stator core has an L-shaped cross-sectional area in the plane of the motor axis, one leg of the L extending into the upper part of the hub and the other extending into the flange under the disks. A portion of the coil surrounds the upper leg in the longitudinal direction, while another portion of the coil surrounds the lower leg perpendicular to its longitudinal direction. The first leg of the core drives the upper set of permanent magnets mounted within the holes of the disks, while the second leg drives a set of permanent magnets mounted in the flange.

In a second embodiment, the stator core includes two separate pieces, one corresponding to each set of permanent magnets. The separate core pieces are wound with separate coils.

In either embodiment, the separate coils or coil portions may be electrically connected in series or in parallel, or may be connected to switches enabling them to be driven in series or parallel selectively. Furthermore, the phases of the two sets of permanent magnets may be staggered to reduce the effects of transition from one magnetic pole to the next. Where the stator core includes two separate pieces, it is also possible to stagger the stator phases as well, reducing torque pulsations and wire interference.

Because the hub normally requires a flange at the bottom to support the disks, the location of a part of the motor within the flange can be accomplished with very little wasted space. Furthermore, the permanent magnet located within the flange is located at a considerably greater distance from the axis than is possible for the magnet located within the upper part of the hub, thus achieving significant increase in motor torque.

DETAILED DESCRIPTION OF THE PREFERRED EMBODIMENT

Figure 1:
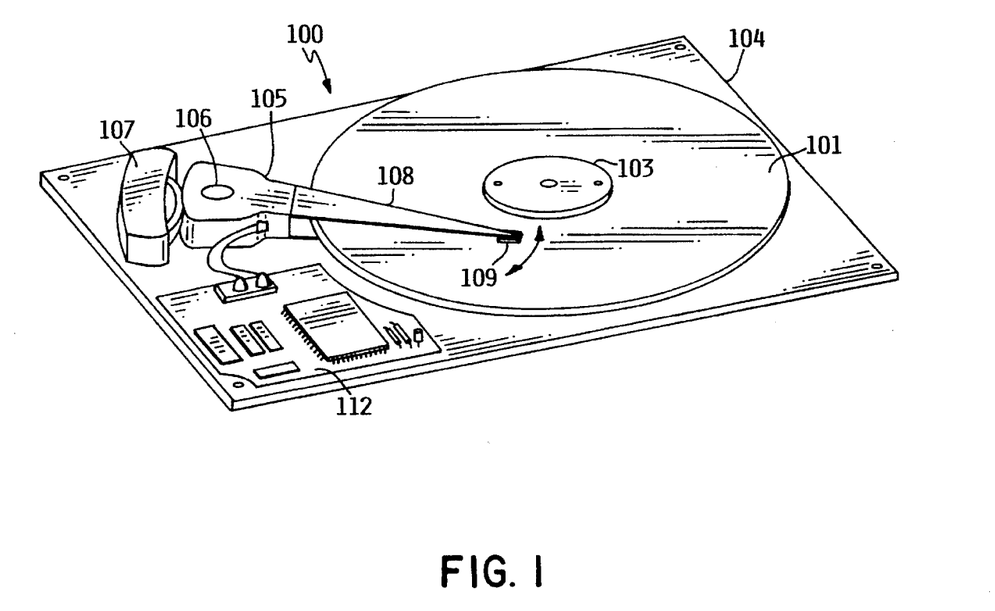
FIG. 1 shows a magnetic disk drive storage unit according to the preferred embodiment.

FIG. 1 shows a magnetic disk drive storage unit 100 in accordance with the preferred embodiment. Disk unit 100 comprises rotatable disk 101, which is rigidly attached to hub assembly or spindle 103, which is mounted on disk drive base or housing 104. Spindle 103 and disk 101 are driven by a drive motor at a constant rotational velocity. The drive motor is contained within hub assembly 103. Actuator assembly 105 is situated to one side of disk 101. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on a circuit card 112 within the head/disk enclosure formed by base 104 and the cover. In this embodiment, circuit card 112 is mounted within the enclosure and shaped to take up unused space around the disk in order to conserve space, as would be used for a PCMCIA Type II form factor. However, the card 112 could also be mounted outside the head/disk enclosure, or the base itself could be made as a circuit card for mounting electronic modules directly to it. A plurality of head/suspension assemblies 108 are rigidly attached to the prongs of actuator 105. An aerodynamic read/write transducer head 109 is located at the end of each head/suspension assembly 108 adjacent the disk surface.

While disk drive 100 is shown with a single disk such as would be used for a PCMCIA Type II form factor, it should be understood that the present invention could utilize a drive having multiple disks mounted on the spindle.

Figure 2:
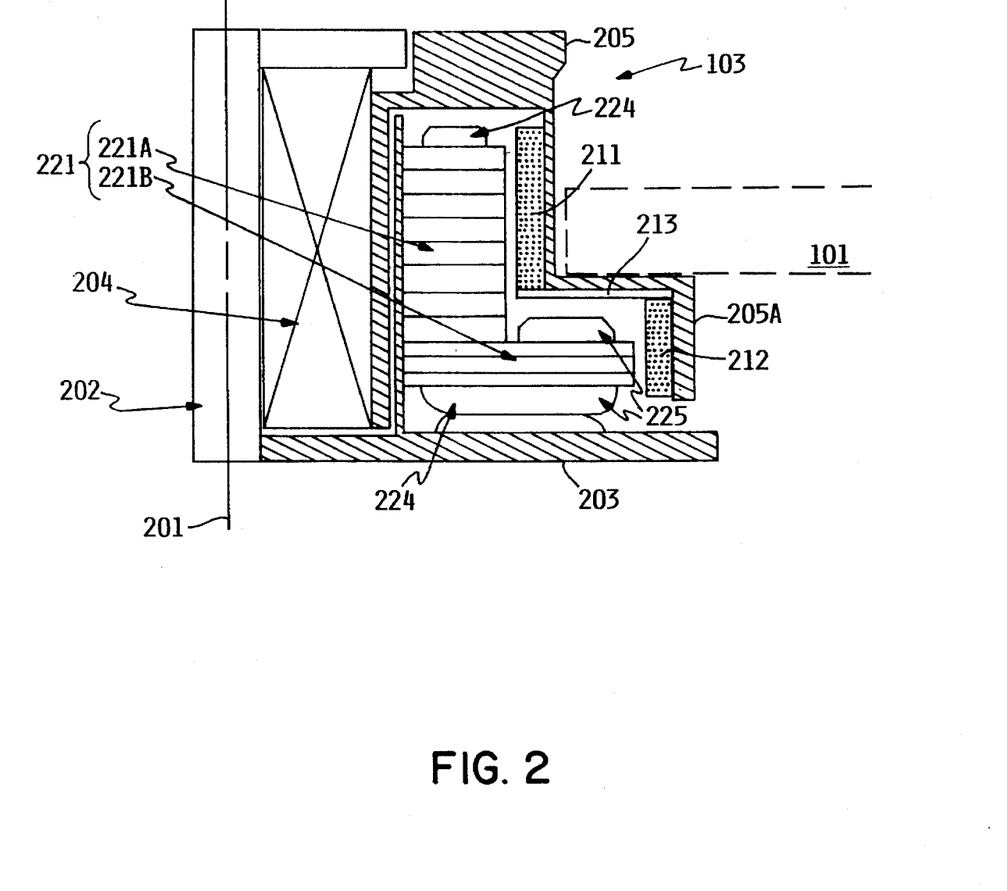
FIG. 2 is a sectional view of the hub assembly including spindle motor according to the preferred embodiment.

FIG. 2 shows in greater detail hub assembly 103 and related hardware, including components of the spindle motor, in accordance with the preferred embodiment. FIG. 2 is a half sectional view, taken in the plane of the axis of rotation of the disks. Disk shaft 202 is rigidly attached to motor base 203, which is in turn rigidly attached to base 104 of the disk drive. Motor base 203 and disk drive base 104 may alternatively be integrally formed as a single piece to conserve additional space. Shaft 202 is preferably steel. Disk axis 201 runs through the center of shaft 202. While hub assembly 103 on only one side of the axis is depicted in FIG.

2, it should be understood that hub assembly 103 is symmetrical about the axis. Rotor housing 205 is mounted on bearing assembly 204 for rotation about axis 201. Bearing assembly preferably comprises two sets of ball bearings in sealed beating races, at opposite ends of shaft 202. However, bearing assembly could alternatively be a fluid (hydrodynamic) or other type of bearing.

Rotor housing 205 has a roughly cylindrical main body (upper or hub portion), and a cylindrical flange portion 205A extending outward from the main body thereof, near the bottom. Flange portion 205A supports disk 101 from below. Rotor housing is preferably steel to provide a magnetically permeable back iron for the permanent magnets. However, other materials such as plastic may also be used, with or without a separate back iron member. A clamp mechanism (not shown) applies an axial force downward on the disk, pressing it against the flange and holding it in place. Where multiple disks are used, spacers are interposed between each disk and the clamping mechanism presses the entire disk stack against the flange. Various clamping mechanisms and spacers are known in the art.

Housing 205 is hollow for placement of motor components. Upper permanent magnet 211 is fastened to the inside of rotor housing 205 within the hole of disk 101. Lower permanent magnet 212 is fastened to the inside of flange portion 205A of housing 205. Connecting ring 213 made of a non-magnetic material connects lower magnet 212 to upper magnet 211.

Motor core 221 preferably comprises a series of laminations of a magnetically permeable material, built up to have an L-shaped cross-section as shown. The laminations are preferably made from silicon steel, although any appropriate magnetically permeable material may be used. Upper leg portion 221A of core 221 extends into the upper part of housing 205, within the hole of disk 101. Lower leg portion 221B of core 221 extends outward from the axis into flange portion 205A of housing 205.

Motor coils or windings 224,225 surround core 221 to form the stator electromagnet. The wires of windings 224, 225 are wound substantially parallel to disk axis 201. Winding 224 encircles upper leg core 221A in the longitudinal (axial) direction. I.e., wires of winding 224 generally run from the top of upper leg core 221A to the bottom of core 221A and back again. Winding 225, which is substantially parallel to winding 224, encircles lower leg core 221B in the short direction, from top to bottom and back.

Figure 3:
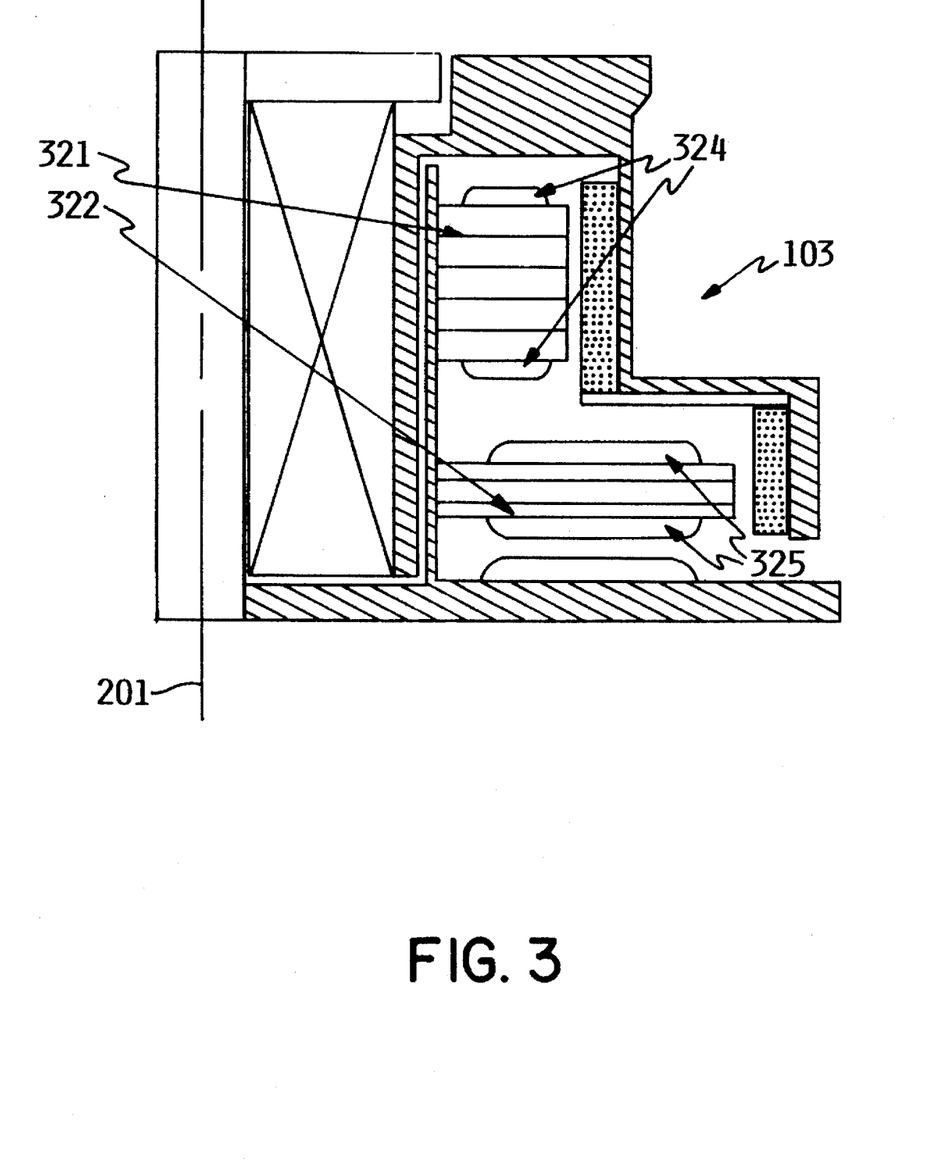
FIG. 3 is a sectional view of the hub assembly including spindle motor according to an alternative embodiment.

FIG. 3 shows an alternative embodiment of hub assembly 103 and related hardware. Specifically, in the alternative embodiment rotor housing 205 and magnets 211,212 are the same as in the preferred embodiment. However, the stator is constructed differently. The stator of the alternative embodiment comprises two separate core pieces 321,322, which drive magnets 211,212 respectively. Windings 324,325 encircle the respective core pieces. As is true of the preferred embodiment, windings 324,325 of the alternative embodiment may be electrically connected in series or in parallel, or may be separately switched.

Figure 4:
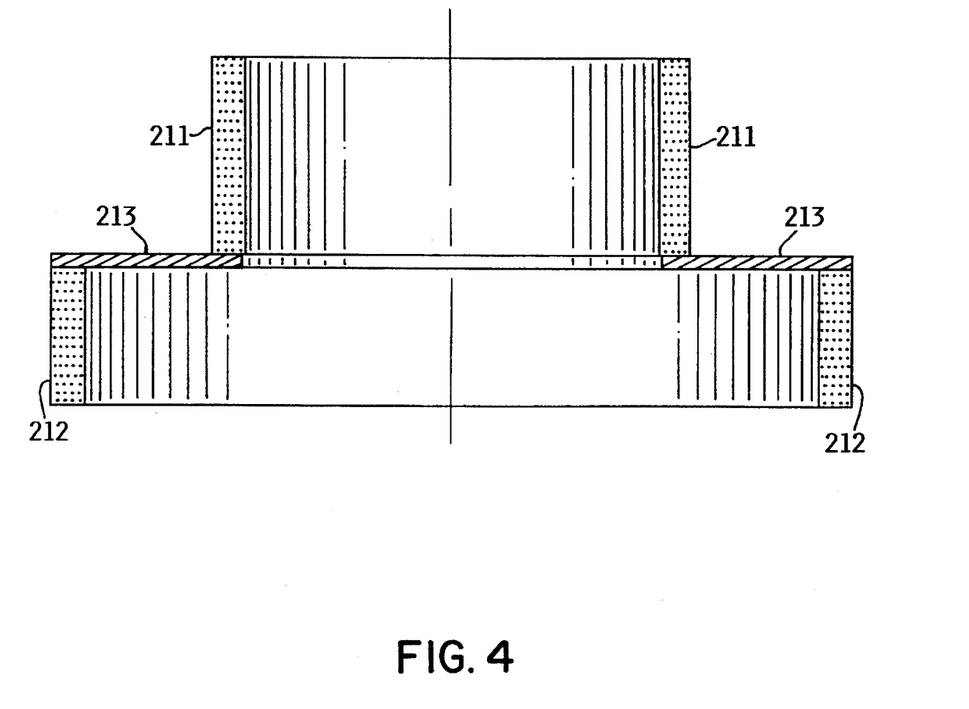
FIG. 4 is a sectional view of the rotor magnet assembly before insertion into the rotor, according to the preferred embodiment.

In either embodiment depicted in FIGS. 2 or 3, permanent magnets 211,212 are preferably assembled to non-magnetic connecting ring 213 before insertion into rotor housing 205. FIG. 4 is a sectional view of the permanent magnet assembly before insertion. Connecting ring 213 is preferably nylon, although other materials could be used. Magnets 211,212 are preferably attached to non-magnetic connecting ring 213 with a suitable adhesive. Preferably, magnetic material for the magnets is first assembled to the non-magnetic ring, a permanent magnetic field is then imposed on the magnets, and they are then inserted into the rotor. This method of assembly assures that a precise circumferential alignment (including optional offset) can be obtained between the upper and lower sets of magnets.

The double-decker motor configuration of the present invention provides an added benefits through an additional degree of freedom in the motor design. Because the motor spins in only one direction, the two sets of starer and rotor assemblies can be purposely staggered in phase to improve the torque ripple characteristics and motor acoustics. In the preferred embodiment, this can be accomplished by circumferentially offsetting the two sets of permanent magnets 211,212.

Figure 5:
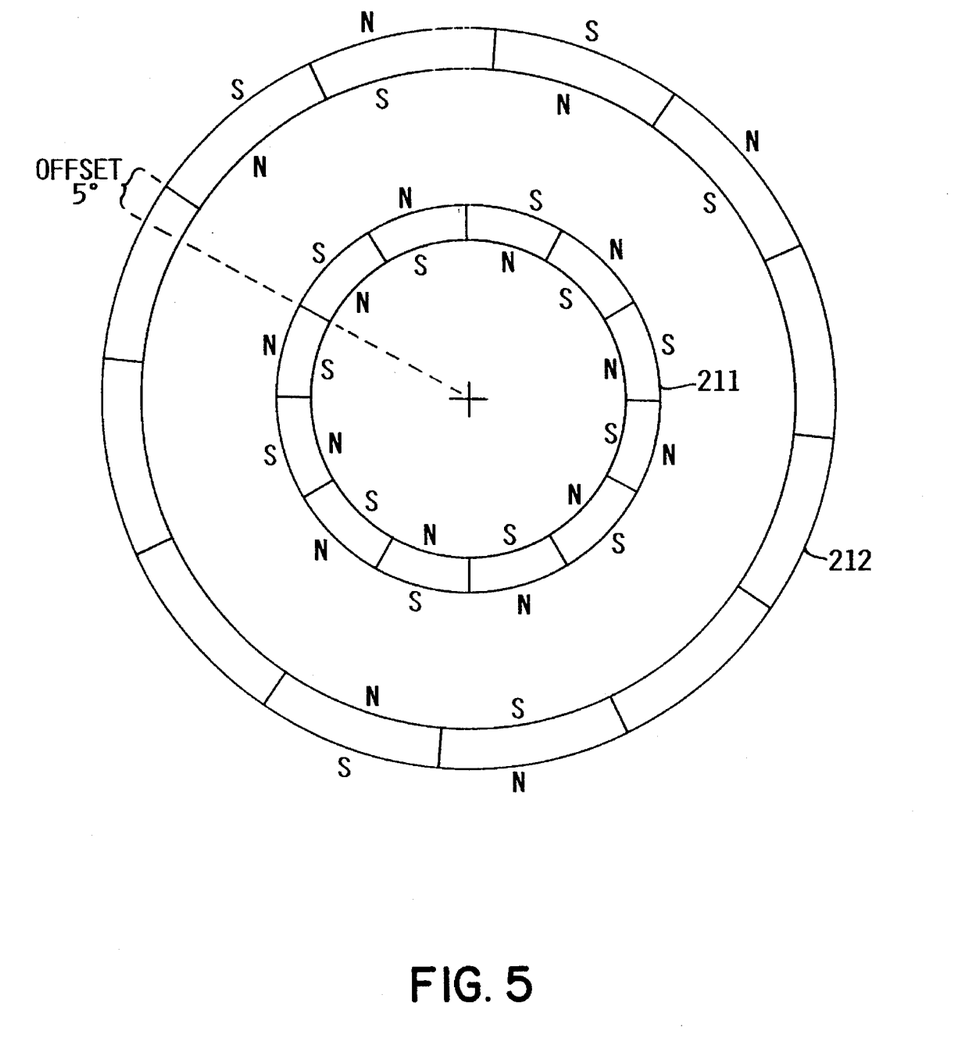
FIG. 5 shows the rotor magnet assembly as viewed in a plane perpendicular to the axis of disk rotation according to the preferred embodiment.

FIG. 5 shows the rotor magnet assembly as viewed in a plane perpendicular to the axis of disk rotation. Each set of permanent magnets 211,212 preferably comprises 12 individual magnet poles of alternating polar orientation, which collectively surround the disk axis. The upper set of magnets 211 surrounds the axis at a shorter radius than the lower set 212. Preferably, the two sets are slightly offset circumferentially, as shown. Where 12 magnet poles per set are used as in the preferred embodiment, and there are nine stator windings in each set, it is preferred that the offset between the two sets of magnets be approximately five degrees. However, the amount of preferred offset will vary with the number of phases in the stator windings, the number of magnets in each set, and other design considerations. It would also be possible to construct the motor without any offset.

Figure 6:
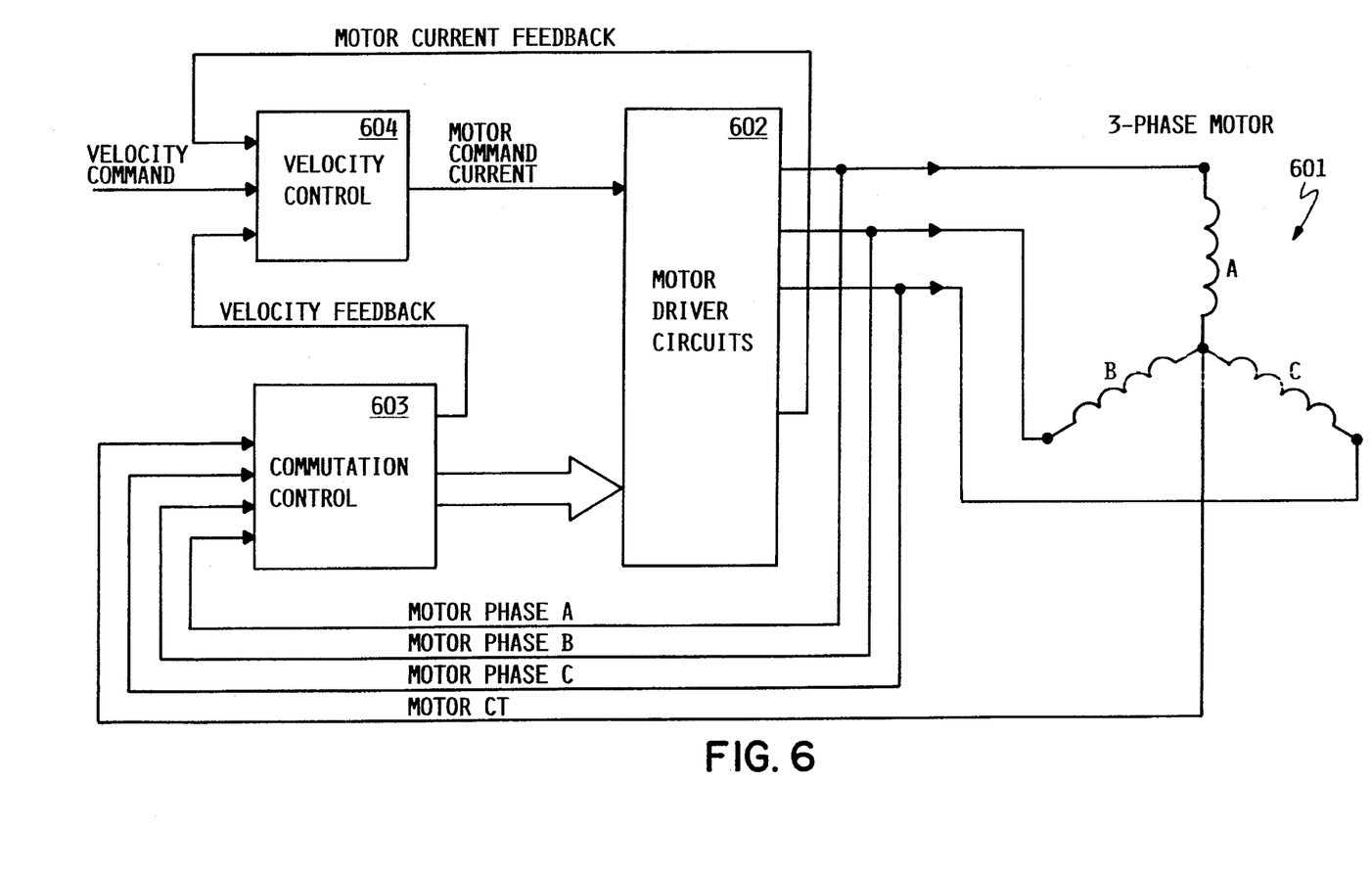
FIG. 6 shows the major components of electronic drive circuitry for the spindle motor of the preferred embodiment.

FIG. 6 shows the major components of electronic drive circuitry for the spindle motor of the preferred embodiment. Preferably, the starer windings are connected in a 3-phase wye configuration 601 having a central tap, although a delta configuration could also be used. The three phases of the stator windings are driven by switchable 3-phase current driver circuits 602. Driver circuits 602 drive windings selected by commutation control circuit 603 at the current specified by a current signal. Commutation control circuit 603 receives feedback from the driver phases and central tap to sequentially switch the phases of current driver circuits 602 as the motor rotates. Commutation control 603 also provides a velocity feedback signal to velocity control circuit 604. Velocity control circuit 604 also receives a motor current feedback signal from current driver circuits 602. Velocity control circuit compares actual velocity to a desired reference velocity input from e.g., a disk drive microprocessor controller. Velocity control circuit 604 adjusts the rotational velocity of the motor to conform to the reference velocity by varying an input current signal to the current driver circuits 602. Preferably, drive circuit components 602–604 are located on common circuit card 112 with other disk drive electronic components. While drive circuit components 602–604 am shown as separate blocks for illustrative purposes, it should be understood that they could be contained on a common circuit chip, and may sham a chip with other disk drive circuitry.

Figure 7:
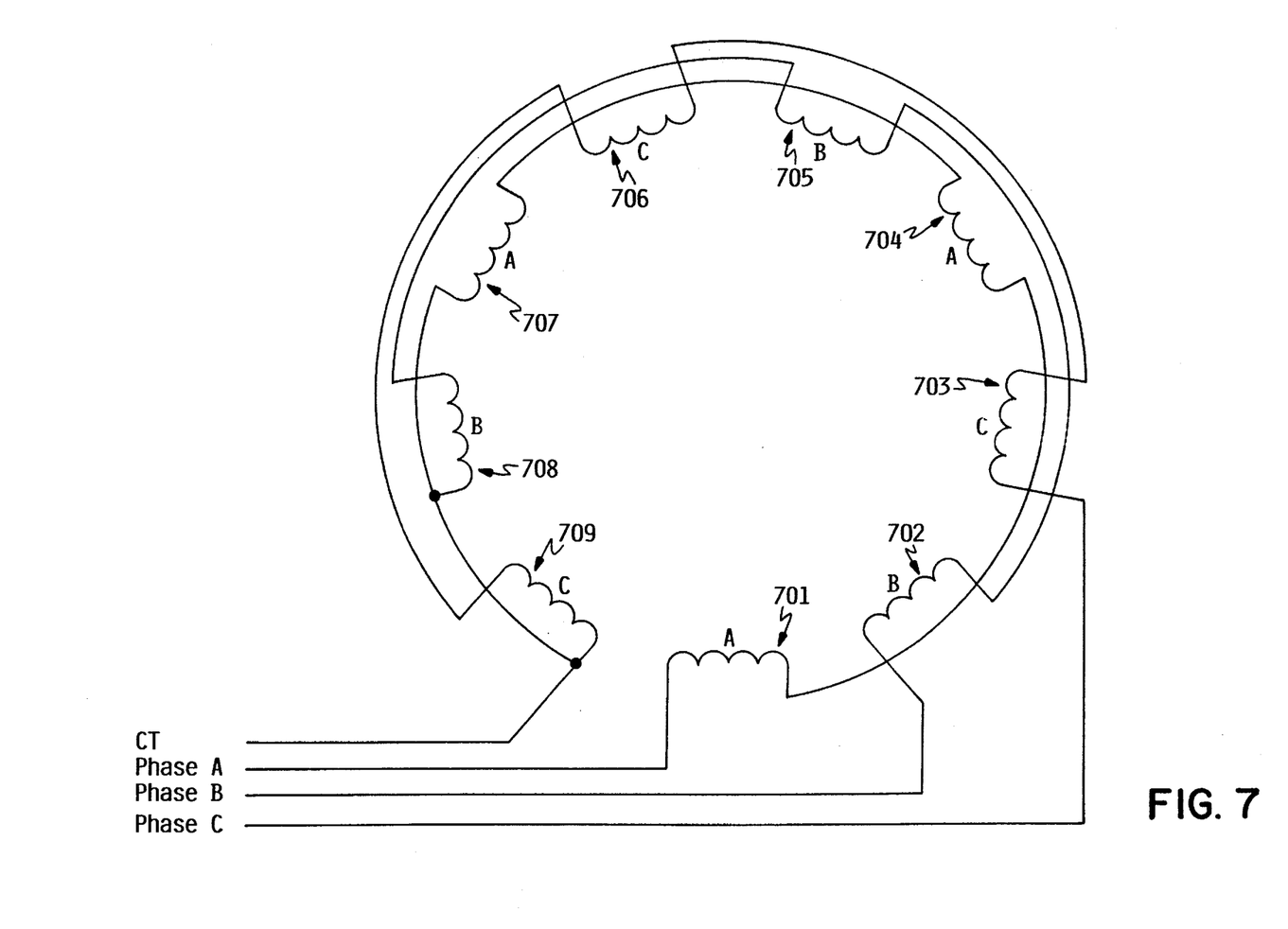
FIG. 7 shows in greater detail the configuration of stator windings according to the preferred embodiment.

FIG. 7 shows in greater detail the configuration of stator windings 601. Preferably, stator windings 601 are arranged as shown with three poles per phase, or a total of nine poles 701–709. All windings of a single phase are in series. In the preferred embodiment, in which core 221 has an L-shaped cross-sectional area as shown in FIG. 2, windings 224,225 are in reality portions of a single pole winding 701, the portions 224,225 being wound in series. The winding configuration of FIG. 7 may also be used in the alternate embodiment of FIG. 3, in which case windings 324,325 in each pole are connected in series.

Figure 8:
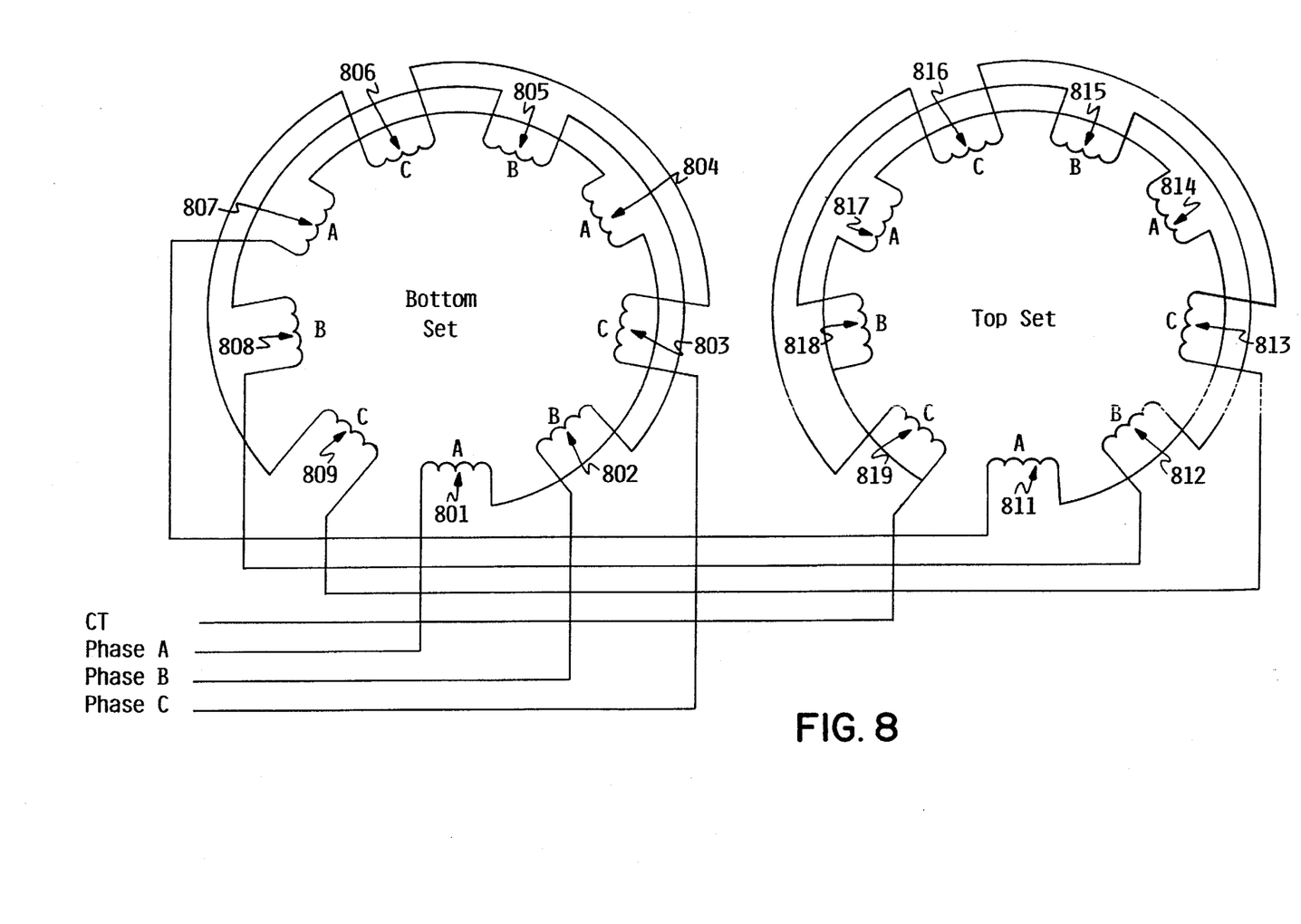
FIG. 8 shows in greater detail the configuration of stator windings in an alternative embodiment.

FIG. 8 shows an alternative winding configuration, in which all poles of the lower windings 801–809 are connected in series before the poles of the lower windings 811–819. The configuration of FIG. 8 is particularly applicable to the alternate embodiment of core pieces shown in FIG. 3. Because core pieces are separated in this embodiment, separation of upper and lower windings is more easily accomplished.

While windings shown in the preferred embodiment are connected in series, it should be understood that windings could alternatively be connected in parallel, either as individual poles or groups of upper and lower poles. For example, it would be alternatively possible to connect winding poles 701,704 and 707 in parallel with the Phase A drive circuit. As another alternative, it would be possible to connect group of winding poles 801,804 and 807 in series and group of winding poles 811,814 and 817 in series, and connect the two groups in parallel with the Phase A drive circuit. It would additionally be possible for the drive circuitry to selectively switch between serial and parallel connections to obtain maximum torque at motor start-up and maximum efficiency at running speed, as described in commonly assigned copending patent application Ser. No. 08/109,752 to Apuzzo, filed Aug. 19, 1993, herein incorporated by reference. It would additionally be possible to selectively power the two sets of stator windings, for example, to power both sets during start-up or conditions of peak load, but to power only one set at other times.

It would alternatively be possible to stagger the sets of stator windings, where separate windings are used as depicted in FIG. 3. In such an alternative embodiment, the two sets of separate windings would be connected as shown in FIG. 8, but the two sets of windings would be circumferentially offset from one another in a manner similar to the offset of permanent magnets shown in FIG. 5.

In the preferred embodiment, a configuration of 12 permanent magnet poles in the rotor and 9 stator poles (3 phases having three poles each) is used. However, it will be understood by those skilled in the art that the number of permanent magnet poles, stator poles and stator phases may vary. A larger number of poles will generally reduce noise and vibration, but becomes more difficult to construct, particularly where the parts must be very small as with a PCMCIA Type II disk drive. The 12/9 configuration is chosen for the preferred embodiment as appropriate for a small form factor disk drive, but other configurations may be more suited to different applications.

In the description above, the narrower main body of the rotor housing and related components have sometimes been referred to as the "upper" portion or set, while the wider flange and related components have been called the "lower" portion or set. "Upper" and "lower" are used only for ease of reference and are consistent with the normal orientation used in the art. However, the use of these terms is not meant to imply that the present invention requires the flange to be located below the main body portion of the rotor. The motor and disk drive of the present invention could just as easily be constructed with the flange located above the main body, or with the axis of rotation oriented horizontally.

In the preferred embodiment, the electric motor of the present invention is used as a spindle motor of a disk drive storage device. As explained above, the demand for miniaturized devices of this type provides an impetus for extremely compact motors. However, it would be possible to use such a motor in other applications requiring a very compact motor design, such as special purpose pumps, fans, etc. Furthermore, while in the preferred embodiment the storage devices are rotating magnetic disk drive storage devices, it should be understood that the present invention may be applicable to optically read disk devices such as CD-ROM or disk-storage using other recording technologies.

Although a specific embodiment of the invention has been disclosed along with certain alternatives, it will be recognized by those skilled in the art that additional variations in form and detail may be made within the scope of the following claims.

What is claimed is:

1. A rotating disk data storage device, comprising:

a disk drive base;

at least one disk for recording data, said disk being adapted to rotate about an axis of rotation, said disk having a circular aperture at its center for mounting said disk on a rotatable hub assembly;

at least one transducer head for reading data stored on said disk;

a moveable actuator mounted on said disk drive base for positioning said transducer head to read data recorded on said disk, said transducer head being attached to said moveable actuator; and a spindle motor mounted on said disk drive base for rotating said at least one disk about said axis of rotation, said spindle motor comprising:
(a) a rotor housing adapted to rotate about said axis of rotation, said rotor housing having a substantially cylindrical main body portion, said main body portion having a diameter less than the diameter of said aperture of said disk, and a substantially cylindrical flange portion extending radially outward from said main body portion, said flange portion having a diameter greater than the diameter of said aperture of said disk, said flange portion supporting said disk;
(b) a first set of permanent magnets mounted within said cylindrical main body portion of said rotor housing and surrounding said axis of rotation at a first radial distance;
(c) a second set of permanent magnets mounted within said flange portion of said rotor housing and surrounding said axis of rotation at a second radial distance, said second radial distance being greater than said first radial distance; and
(d) an electromagnetic stator assembly rigidly mounted to said disk drive base and surrounding said axis of rotation, said electromagnetic stator assembly including a first stator portion for driving said first set of permanent magnets, and a second stator portion for driving said second set of permanent magnets.

2. The rotating disk data storage device of claim 1, wherein said first set of permanent magnets is circumferentially offset from said second set of permanent magnets.

3. The rotating disk data storage device of claim 1, wherein said electromagnetic stator assembly comprises a plurality of cores surrounding said axis, each core having a substantially L-shaped cross-section in a plane containing said axis, forming two legs of said core, a first leg of said core being adjacent said first set of permanent magnets, and a second leg of said core being adjacent said second set of permanent magnets, said electromagnetic stator assembly further comprising a winding surrounding each respective leg of each respective core, said first stator portion comprising the first leg of each respective core, and said second stator portion comprising the second leg of each respective core.

4. The rotating disk data storage device of claim 1, wherein said electromagnetic stator assembly comprises a first set of cores and a second set of cores separated from said first set of cores, each set of cores comprising a plurality of cores surrounding said axis, said stator assembly further comprising at least one winding surrounding each respective core, said first set of cores being positioned adjacent said first set of permanent magnets and said second set of cores being positioned adjacent said second set of permanent magnets, said first stator portion comprising said first set of cores, and said second stator portion comprising said second set of cores.

5. The rotating disk data storage device of claim 4, wherein said first set of cores is circumferentially offset from said second set of cores.

6. The rotating disk data storage device of claim 4, wherein said first set of permanent magnets is circumferentially offset from said second set of permanent magnets.

7. The rotating disk data storage device of claim 4, wherein said first and second set of cores are selectively powered.

8. The rotating disk data storage device of claim 1, wherein said spindle motor further comprises:

(e) a non-magnetic connecting ring mounted within said rotor housing and to which said first and second sets of permanent magnets are attached, said first set of permanent magnet being attached to a first surface of said connecting ring near its inner edge, and said second set of permanent magnets being attached to a second surface of said connecting ring near its outer edge, said annular member fixing the relative circumferential positions of said first and second sets of permanent magnets.

* * * * *